United States Patent [19]
Lebby et al.

[11] Patent Number: 5,493,437
[45] Date of Patent: Feb. 20, 1996

[54] EXTERNAL COMMUNICATION LINK FOR A CREDIT CARD PAGER

[75] Inventors: Michael S. Lebby, Apache Junction; Shun-Meen Kuo, Chandler, both of Ariz.

[73] Assignee: Motorola, Schaumburg, Ill.

[21] Appl. No.: 119,635

[22] Filed: Sep. 13, 1993

[51] Int. Cl.$^6$ ................................. H04B 10/00
[52] U.S. Cl. ............... 359/152; 359/163; 385/14; 379/56
[58] Field of Search ................ 359/152, 163, 359/173, 188, 195; 385/14, 15, 24, 31, 39, 49, 52, 53, 54, 55, 76, 77, 78, 88; 340/825.44, 311.1; 379/56; 455/73

[56] References Cited

U.S. PATENT DOCUMENTS

| | | | |
|---|---|---|---|
| 4,625,333 | 11/1986 | Takezawa et al. | 455/612 |
| 4,737,946 | 4/1988 | Yamashita et al. | 369/45 |
| 4,750,799 | 6/1988 | Kawachi et al. | 350/96.11 |
| 4,810,050 | 3/1989 | Hooper | 350/96.14 |
| 4,865,453 | 9/1989 | Gidon et al. | 356/358 |
| 5,123,066 | 6/1992 | Acarlar | 385/14 |
| 5,199,087 | 3/1993 | Frazier | 385/14 |
| 5,199,093 | 3/1993 | Longhurst | 385/88 |
| 5,237,434 | 8/1993 | Feldman et al. | 359/19 |
| 5,239,295 | 8/1993 | DeLuca et al. | 340/825.44 |
| 5,271,083 | 12/1993 | Lebby et al. | 385/130 |
| 5,337,391 | 8/1994 | Lebby | 385/88 |

*Primary Examiner*—Hezron E. Williams
*Assistant Examiner*—Richard A. Moller
*Attorney, Agent, or Firm*—Eugene A. Parsons

[57] ABSTRACT

A credit card pager having a casing surrounding a substrate and electronic circuitry mounted on the substrate. An information connection including at least one molded waveguide having a core with a photonic device mounted at one end and a second end of the core being positioned on the substrate to be accessible exterior of the casing so as to communicate optical information signals therethrough.

9 Claims, 3 Drawing Sheets

EXTERNAL COMMUNICATION LINK FOR A CREDIT CARD PAGER

This application is related to a patent application entitled "Optical Bus With Optical Transceiver Modules and Method of Manufacture", Ser. No. 07/943,641, Filed Sep. 11, 1992, and incorporated herein by reference.

FIELD OF THE INVENTION

The present invention pertains to credit card pagers and more specifically to apparatus for connecting credit card pagers to external apparatus for using information from the credit card pager and supplying information to the credit card pager.

BACKGROUND OF THE INVENTION

Credit card type pagers are presently available on the market, which pagers receive the name from the fact that they are approximately the size of a credit card. Generally, they consist of a small alpha-numeric screen/display which includes a matrix of liquid crystal devices (LCD) for low power consumption. The pager receives telephone signals and messages via R.F. signals and, in some recent concepts, can actually transmit or resend simple messages (e.g., acknowledge signals) on a return R.F. signal. One major problem is that the pager is only capable of a few tasks and, with data limitations on the R.F. signal, more dot matrix displays of video (compressed or otherwise) may strain system performance from sender to credit card pager.

It is extremely difficult to make external connections to the credit card pager because the size and shape can not be altered. The size and shape of the credit card pager is the major advantage of this device and any connections that alter the shape or make them less convenient are not acceptable. However, many advantages could be obtained if information could be coupled between a credit card pager and external apparatus. For example, messages received on the credit card pager could be stored and periodically printed on an external printer, reprogramming of the credit card pager (addresses, prestored messages, etc.) could be accomplished, etc. Some attempts have been made to communicate with credit cards (not credit card pagers) by using magnetic coupling. However, this types of communication severely limits the amount and speed of information transfer. Thus, apparatus for quickly and conveniently coupling information between external apparatus and a credit card pager is highly desirable.

It is a purpose of the present invention to provide a new and improved credit card pager.

It is a further purpose of the present invention to provide a new and improved credit card pager with an external communication link.

It is a still further purpose of the present invention to provide a new and improved credit card pager with an external communication link which is small enough to not alter the size or shape of the pager.

It is another purpose of the present invention to provide a new and improved credit card pager with an external communication link which is capable of carrying large quantities of information to and from the pager at high speeds.

It is still another purpose of the present invention to provide a new and improved credit card pager with an external communication link which is inexpensive to fabricate and simple to operate.

SUMMARY OF THE INVENTION

The above problems and others are at least partially solved and the above purposes and others are realized in an external information connection for a credit card pager having a casing surrounding a substrate and electronic circuitry mounted on the substrate, the information connection including at least one molded waveguide having a core with a photonic device mounted at one end and a second end of the core being positioned to be accessible exterior of the casing so as to communicate optical information signals therethrough.

In a further embodiment, the external connection includes an optical transceiver module mounted on the credit card pager and an optical transceiver module mounted on external apparatus, such as a computer, with an optical fiber ribbon having mating connections on each end thereof to mate with the modules and provide an optical communications link between the credit card pager and the external apparatus. The modules are constructed to be thinner than the credit card pager and generally less than approximately one millimeter thick when mounted in the pager.

BRIEF DESCRIPTION OF THE DRAWINGS

Referring to the drawings.

DESCRIPTION OF THE PREFERRED EMBODIMENTS

Figure 1:
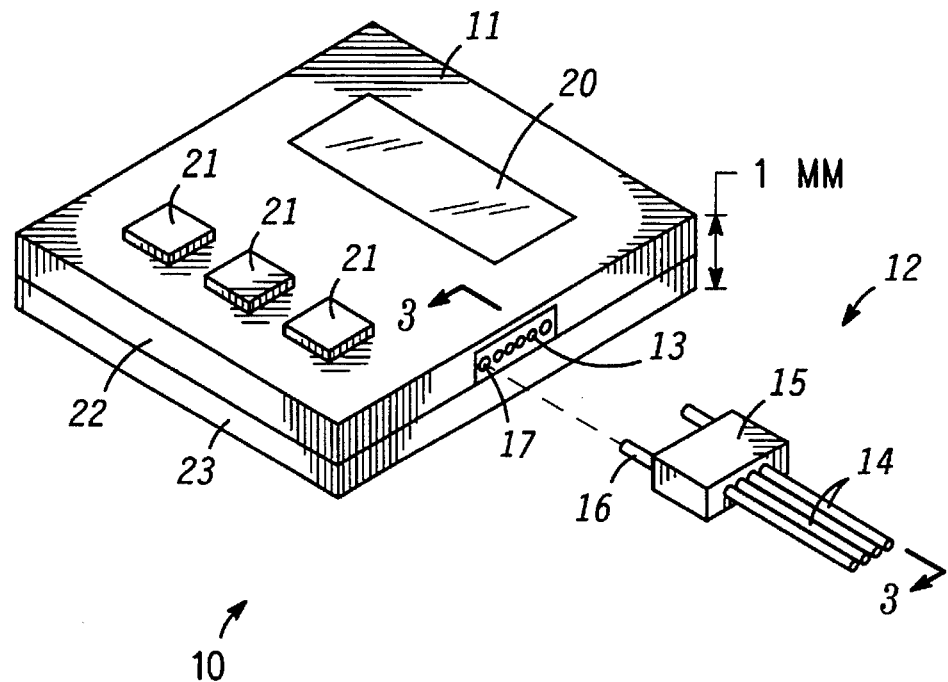
FIG. 1 is a view in perspective of a credit card pager with external information connection, portions thereof removed, incorporating the present invention.

Referring specifically to FIG. 1, a perspective view is illustrated of a credit card pager 10 with external information connection 12, portions thereof removed, incorporating the present invention. External information connection 12 includes a first optical transceiver module 13 mounted in credit card pager 10 so as to extend through a casing 11 of credit card pager 10 and be accessible externally thereto. External information connection 12 further includes external apparatus (not shown) with a second optical transceiver module which is identical to optical transceiver module 13 and an optical fiber ribbon 14 with a connector 15 at each end (only one end of which is shown). Connector 15 includes a pair of outwardly extending pins 16 designed to be engaged within alignment ferrules 17 in one edge of optical transceiver module 13. Pins 16 align a plurality of optical channels within optical ribbon 14 and connector 15 with optical inputs/outputs positioned between alignment ferrules 16 (to be described presently). It should be understood that generally connector 15 will be formed with ferrules also, and the ends of the optical channels (optical ribbon 14) will be polished for substantially gap-free mating with the optical inputs/outputs in optical transceiver module 13. Pins 16 are then inserted and anchored in either the ferrules in connector 15 or in optical transceiver module 13 by frictional engagement, snap-lock, etc.

In this specific embodiment, credit card pager 10 includes a display 20 and a plurality of control buttons 21. Display 20 is, for example, an LCD display of the type well known in the art. Control buttons 21 are the type which can be operated through a thin protective film, e.g., casing 11, and perform the various functions necessary to the proper operation of credit card pager 10, e.g., power on/off, retrieve messages from memory, etc.

Generally, casing 11 of credit card pager 10, including optical transceiver module 13, is formed with upper and lower plastic over molding portions 22 and 23. Over molding portions 22 and 23 are molded to form casing 11 of credit card pager 10 in a well known process and will not be explained further herein. While over molding portions 22 and 23 are utilized herein to encapsulate the inner components of credit card pager 10 and optical transceiver module 13, it will be understood by those skilled in the art that many different types of encapsulation might be utilized, depending upon the specific fabrication techniques, environment, etc. Generally, regardless of the type of casing 11 and how it is formed the size of the pager is approximately that of a credit card with the thickness being on the order of one millimeter or less.

Figure 2:
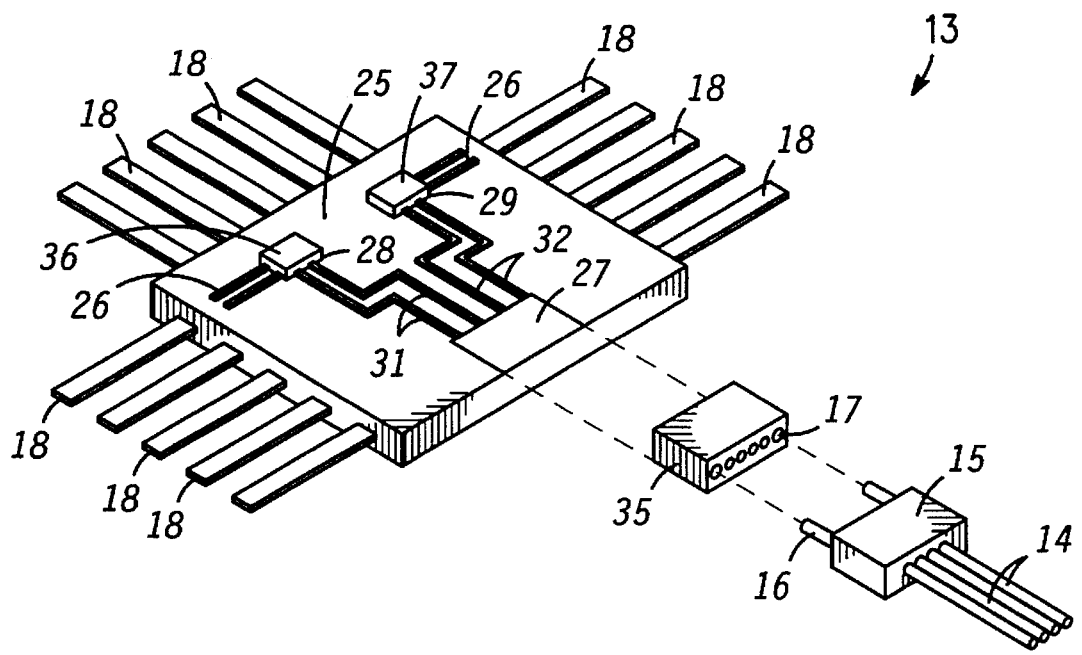
FIG. 2 is an exploded view in perspective of a portion of the credit card pager with external information connection illustrated in FIG. 1.

Referring specifically to FIG. 2, a view in perspective of inner components of optical transceiver module 13 is illustrated. An electrical interconnect and mounting board 25 is provided for mounting the various components to be described, which board 25 is greatly enlarged relative to the other components for better illustration. Board 25 may be as simple as a standard silver plated copper flag or a printed circuit board or, as in the present embodiment, it may be a multilayer laminated board designed to have mounted thereon a plurality of integrated circuit chips. Further, while board 25 is illustrated in this embodiment as only carrying components of optical transceiver module 13, it should be understood that a substrate of credit card 10 could replace board 25 and that these components could be mounted directly on the substrate, or printed circuit board, carrying the components of credit card pager 10. A leadframe forming electrical inputs/outputs 18 is conveniently incorporated into the laminations and electrically connected to electrical conductors 26 on the upper surface of board 25 in any of the well known ways. Board 25 has three different mounting areas 27, 28 and 29 defined thereon with electrical conductors 31 extending between mounting area 27 and 28 and electrical conductors 32 extending between mounting areas 27 and 29.

In this specific embodiment an optical interface 35 is fixedly mounted on board 25 at mounting area 27 and integrated circuits 36 and 37 are fixedly mounted on board 25 at mounting areas 28 and 29, respectively. Optical interface 35 includes all of the optical/electrical and electrical/optical conversion circuits and, therefore, separates all of the tight optical alignment problems from the rest of transceiver module 13. Also, in this embodiment integrated circuits 36 and 37 are packaged for direct mounting by means of conductive epoxy bumps but it will be understood that any convenient means of mounting and connection to electrical conductors 26, 31 and 32 may be utilized. Integrated circuit 36 includes transmitter circuitry for driving light generators contained in optical interface 35 in accordance with signals received at electrical inputs/outputs 18. Integrated circuit 37 contains receiver circuitry for receiving electrical signals generated by optical detectors contained in optical interface 35 in response to light signals received by optical interface 35. Two separate integrated circuits 36 and 37 are utilized for convenience of this description but it should be understood that the two integrated circuits could be contained in a single semiconductor chip.

CMOS gate circuits are utilized, especially in the transmitter included in integrated circuit 36, because they can directly drive light generators, such as VCSELs and the like, without the need for complicated, custom transmitter circuitry. In addition to the fact that the gate circuit is extremely simple, it is utilized because of the speed of the circuit and the low power utilized. No pre-bias of the laser is required, so that standard CMOS digital components can be connected directly to the laser with no more than a single series resistor (for current limiting). This concept, referred to herein as "direct drive" greatly simplifies the transmitter circuits and significantly enhances the method of manufacture for optical transceiver module 13. Direct drive of the light generators from ECL off-the-shelf components can also be utilized to simplify the transmitter circuit. An example of an ECL off-the-shelf component which can be utilized is the ECLinPS series MC10E107FN exclusive OR gate available from MOTOROLA Inc.

Thus, each optical channel associated with the transmitter circuitry is capable of transmitting data at a speed initially determined by a CMOS gate, (which presently is at a 150 Mb/s transmission rate with the 1.2 um ACT series of gates manufactured by MOTOROLA, Inc.), so that optical transceiver module 13 can supply from a few Mb/s to more than 1 Gb/s of parallel data transfer depending upon the specific CMOS version available. This range of data transfer makes optical transceiver module 13 particularly suitable for use in credit card pager 10.

Figure 3:
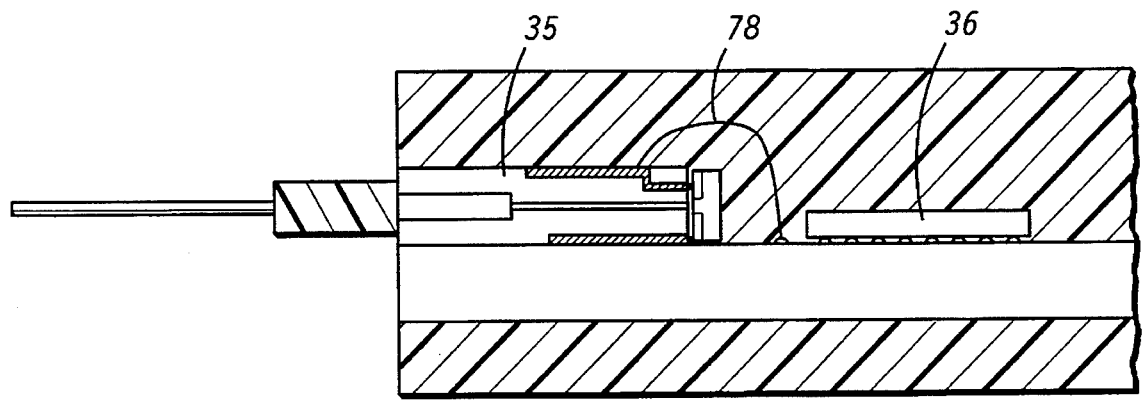
FIG. 3 is a sectional view, portions thereof broken away, of a portion of the external information connection as seen from the line 3—3 in FIG. 1.
Figure 4:
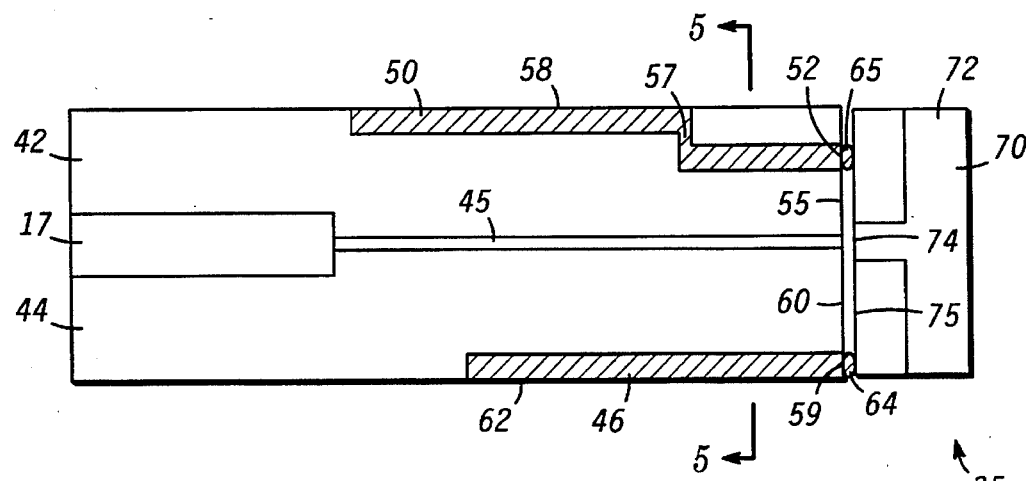
FIG. 4 is a greatly enlarged sectional view of a portion of FIG. 3.
Figure 5:
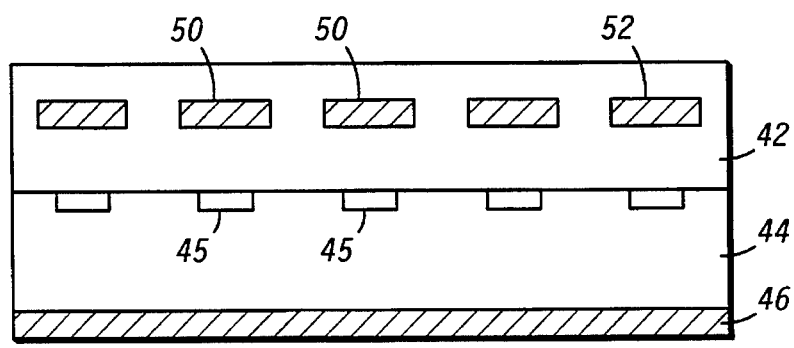
FIG. 5 is a cross-sectional view of the portion of FIG. 4, as seen from the line 5—5 in FIG. 4.

FIG. 3 is a sectional view, portions thereof broken away, of a portion of optical transceiver module 13 as seen from the line 3—3 in FIG. 1. In this preferred embodiment optical interface 35 includes a molded optical waveguide 40, which can be seen in more detail in FIGS. 4 and 5. FIG. 4 is a greatly enlarged sectional view of optical interface 35 and of molded waveguide 40. FIG. 5 is a cross-sectional view of molded waveguide 40 as seen from the line 5—5 in FIG. 4.

Molded waveguide 40 is made of first cladding layer 42, second cladding layer 44 and cores 45. Second cladding layer 44 is molded with axially extending channels in the inner surface thereof, which channels are designed to receive unprocessed core material therein. Typically, the inner surfaces of molded first cladding layer 42 and molded second cladding layer 44 are joined by an optically transparent material which forms cores 45 of waveguide 40 and acts as an adhesive and an optically transparent polymer. The optically transparent material generally may be any of several materials, such as epoxies, plastics, polyimides, or the like. Generally, refractive indexes of these optically transparent materials range from 1.54 to 1.58. It should be understood that to form an optical waveguide the refractive index of cores 45 should be at least 0.01 greater than the refractive index of cladding layers 42 and 44.

In this specific embodiment of molded waveguide 40, epoxy is used to join the inner surface of first cladding layer 42 to the inner surface of second cladding layer 44. Application of the epoxy is done in a manner so as to completely fill the channels of first cladding layer 42, thereby forming cores 45. Further, by having cores 45 completely surrounded by cladding layers 42 and 44, cores 45 have superior performance characteristics for conducting light or light signals. Additionally, a capability is available, in molded waveguide 40, to match refractive indexes of cladding layers 42 and 44.

In addition, second cladding layer 44 has a ground plane, or ground conductor, 46 affixed to the lower surface thereof. Also, a plurality of electrical conductors 50, in this embodiment one for each core 45, are molded into first cladding layer 42. Electrical conductors 50 are, for example, provided in the form of a flexible leadframe, which leadframes are well known in the semiconductor art. Ground conductor 46 and conductors 50 are formed of any convenient electrically conducting material, such as copper, aluminum, gold, silver, etc.

As can be seen especially in FIGS. 4 and 5, electrical conductors 50 are molded into first cladding layer 42 and each have a first end forming an electrically accessible contact 52 in end 55 of molded optical waveguide 40. Electrical conductors 50 extend into the bulk of first cladding layer 42 and are bent at 57 with two generally ninety degree bends so that a portion 58 of each electrical conductor 50 lies in the upper surface of first cladding layer 42 and is available for external electrical connections thereto. The position of portion 58 in the upper surface of first cladding layer 42 depends upon the specific application and the position and type of external electrical connections to be made. For example, portion 58 could become a site for flip-chip bumping of optical waveguide 40 to substrate 25, or directly to the substrate of credit card pager 10, in which case wirebonding to optical interface 35 would be minimized, as will be apparent presently.

Ground conductor 46 may be molded into, or along with, cladding layer 44, or it may be deposited on cladding layer 44 after the formation thereof. Further, while ground conductor 46 is referred to as a ground plane in this specific embodiment it will be understood by those skilled in the art that in some special applications ground conductor 46 may be molded into second cladding layer 44 and may include a plurality of individual conductors similar to electrical conductors 50. In either case, ground conductor 46 generally includes an externally accessible electrical contact 59 positioned in an end 60 of second cladding layer 44, which end 60 lies in a plane with end 55 of first cladding layer 42, both of which define a first end of optical waveguide 40. Also, ground conductor 46 generally includes an externally accessible electrical portion 62 lying in an external surface of second cladding layer 44.

An optical array 70 is illustrated affixed to the first end of optical waveguide 40, which optical array 70 includes at least one light detector and one light generator. In this specific embodiment optical array 70 contains twenty optical devices 72. Optical devices 72 can be any of the devices known in the art which detect or generate light, or any combination thereof, such as light detecting diodes, light emitting diodes, vertical cavity surface emitting lasers, any of the other known lasers, field emission devices, etc. Each optical device 72 includes an optical input/output 74 positioned in a surface 75 of optical array 70. Each of the optical input/outputs 74 is aligned with a different one of the cores 45 so that light travelling down aligned core 45 enters input/output 74 of optical device 72 or light generated by optical device 72 leaves input/output 74, enters aligned core 45 and is conducted thereby to the opposite end.

Each optical device 72 has a pair of spaced apart electrical terminals positioned in surface 75 of optical array 70 so that one of the terminals connects to contact 52 adjacent, or associated with, aligned core 45 and the other terminal connects to contact 59 of ground conductor 46. The electrical terminals of each optical device 72 are connected to the contacts 52 and 59 adjacent to, or associated with, the aligned core 45 at 64 and 65 (see FIG. 4) by means of a weld or reflowable connection material such as conductive epoxy, solder, solder paste, etc. Generally, since electrical conductors 50 are molded into cladding layer 42 and ground conductor 46 is molded into, or deposited on the surface of, cladding layer 44 the positioning of contacts 52 and 59 is sufficiently accurate to allow satisfactory alignment of optical input/outputs 74 with cores 45 utilizing normal robotics. By simply aligning the pair of terminals of each optical device 72 to contacts 52 and 59 while simultaneously using the upward and downward visual system in a pick 'n place die/robot, tight ±0.1 mil (or ±2 microns) placement can be achieved. The affixing can also be performed manually if convenient.

Once optical array 70 is physically and electrically affixed to optical waveguide 40, optical interface 35 is surface mounted on board 25. Electrical connections to optical devices 72 are made by some convenient means such as wire bonding 78 (see FIG. 3) between externally accessible portions 58 and contacts, or bonding pads, on board 25, or by utilizing portion 58 as a site for flip-chip bonding, as previously described. In general a single contact to ground conductor 46 provides a connection to the opposite side of all of optical devices 72. Thus, each of the twenty optical devices 72 is connected to either the transmitter circuitry in integrated circuit 36 through electrical conductor 31 or the receiver circuitry in integrated circuit 37 through electrical conductor 32. With all of the components fixedly mounted on board 25, the assembly is mounted on a substrate of credit card pager 10 and electrically coupled to the components thereof. As explained previously, credit card pager is then encapsulated in casing 11 by some convenient means, such as plastic over molding utilizing upper and lower plastic over molding portions 22 and 23. During the encapsulation procedure it is necessary to insure the accessibility of ferrules 16 and the ends of cores 45.

Optical inputs/outputs are carried by cores 45 of optical waveguide 40 between the optical inputs/outputs of optical devices 72 and the optical channels within optical ribbon 14 and connector 15. The twenty optical channels within optical ribbon 14 and connector 15 are aligned with cores 45 of optical waveguide 40 by engaging pins 16 of connector 15 in ferrules 17 of optical waveguide 40. Generally, connector 15 is retained in connection with optical transceiver module 13 by means of a press-snap locking mechanism (not shown). In this specific embodiment, twenty channels are utilized, eight of which are for transmission of optical signals from optical transceiver module 13, eight of which are for transmission of optical signals to optical transceiver module 13 and four additional channels for clock signals, parity and handshaking. While twenty channels are utilized herein for the parallel transmission, and reception, of eight bits of data, it will be understood by those skilled in the art that more or less channels could be utilized if desired.

Figure 6:
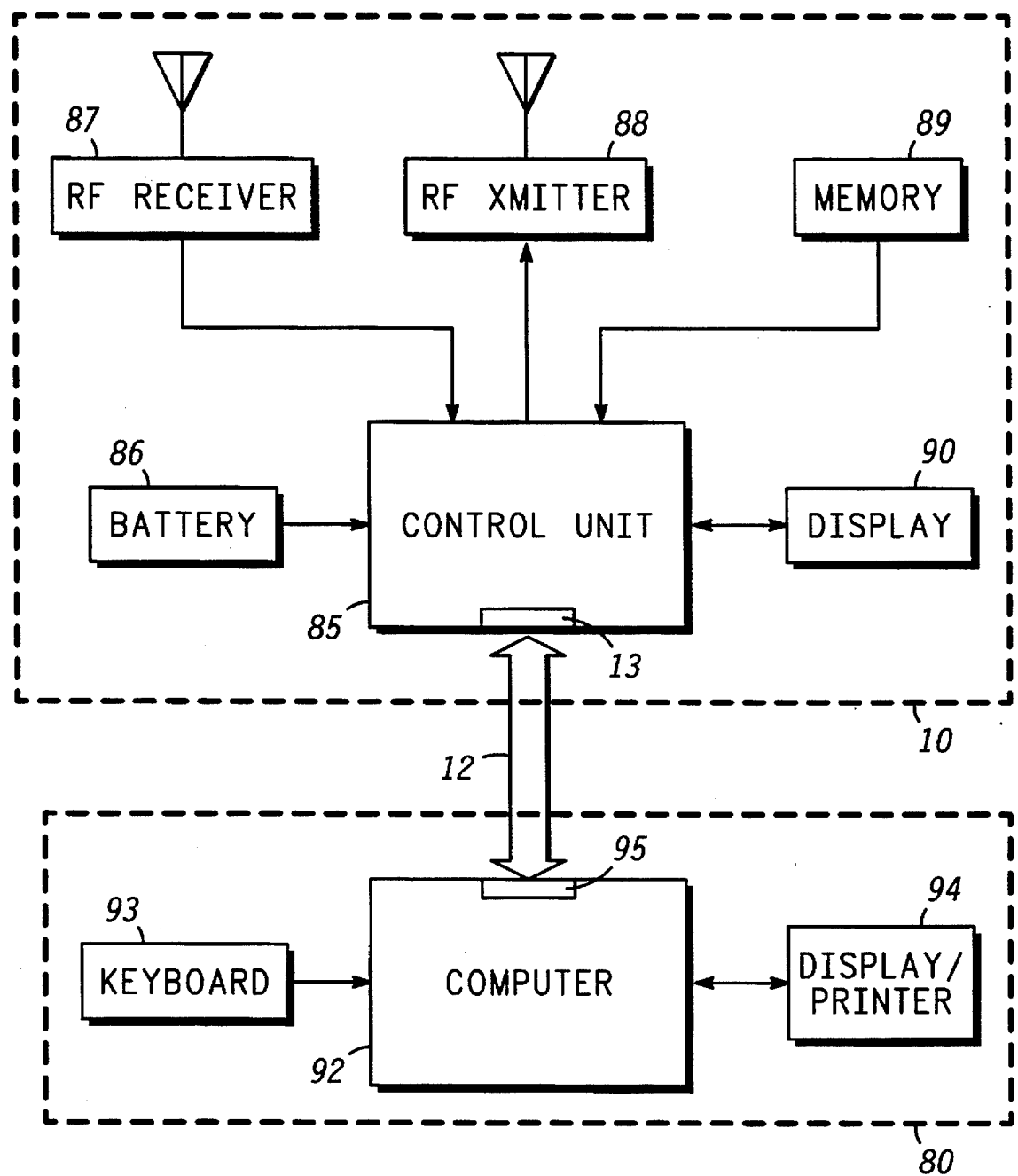
FIG. 6 is a simplified block diagram of a credit card pager with external apparatus coupled in communication therewith.

Referring specifically to FIG. 6, a simplified block diagram of credit card pager 10, external information connection 12 and external apparatus 80 utilized to format information to be transmitted to and received from credit card pager 10 on external information connection 12 is illustrated. Credit card pager 10 includes a control unit 85 coupled to receive electrical power from a battery 86 and to supply electrical power and control signals to an R.F. receiver 87, an R.F. transmitter 88, a memory 89 and a display 90. All of these components operate in a well known manner and the paging operation will not be elaborated upon herein.

External apparatus 80 includes, in this specific embodiment, a computer 92, a keyboard 93 and a display/printer 94. It should of course be understood that apparatus 80 could be any apparatus or circuitry that can perform the specific functions required for each specific application. External information connection 12 includes fiber ribbon 14, optical transceiver module 13 mounted in and electrically coupled to control unit 85 and an optical transceiver module 95 mounted in and electrically coupled to computer 92. Thus, signals can be quickly and efficiently sent to credit card pager 10 to reprogram various functions, etc. and signals can be sent from credit card pager 10 to computer 92 so that messages can be printed by printer 94, etc.

Thus, a new and improved credit card pager with an external communication link has been disclosed. Further, the external communication link disclosed is small enough to not alter the size or shape of the pager and is capable of carrying large quantities of information to and from the pager at high speeds. Also, the new and improved credit card pager with external communication link is inexpensive to fabricate and simple to operate.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An external communication link for a credit card pager comprising:

a credit card pager having a casing surrounding a substrate and electronic circuitry mounted on the substrate;

an optical transceiver module including a light detector having an optical input and an electrical terminal, a light generator having an optical output and an electrical terminal, an optical waveguide including a plurality of spaced apart light conducting cores each having first and second ends optically accessible at first and second ends of the waveguide, respectively, the waveguide further having an alignment guide formed in the second end of the waveguide, the light detector affixed to the first end of the waveguide with the optical input substantially aligned with the first end of a first core of the plurality of cores, and the light generator affixed to the first end of the waveguide with the optical output substantially aligned with the first end of a second core of the plurality of cores; and the optical waveguide being mounted on the substrate of the credit card pager with the electrical terminals of the light detector and the light generator coupled to the electronic circuitry of the credit card pager, and the optical waveguide being further mounted so that the second end of the waveguide and the alignment guide formed in the second end of the waveguide are accessible outside the casing.

2. An external communication link for a credit card pager as claimed in claim 1 wherein the second end of the waveguide and the alignment guide are positioned in an edge of the credit card pager.

3. An external communication link for a credit card pager as claimed in claim 1 wherein the casing and optical transceiver module are constructed with a thickness of less than approximately one millimeter.

4. An external communication link for a credit card pager comprising:

a credit card pager having a substrate and electronic circuitry in a casing;

an optical transceiver module including a light detector having an optical input and an electrical terminal positioned on a first surface thereof, a light generator having an optical output and an electrical terminal positioned on a first surface thereof, an optical waveguide including a plurality of spaced apart light conducting cores each having first and second ends optically accessible at opposite ends of the waveguide, a plurality of electrical conductors each being associated with a different one of the plurality of cores and having an externally accessible contact positioned in a first end of the waveguide adjacent the first end of the associated core and an externally accessible portion positioned on an external surface of the optical waveguide, the waveguide further having an alignment guide formed in a second end of the waveguide opposite the first end, the light detector being affixed to the end of the waveguide with the optical input substantially aligned with the first end of a first core of the plurality of cores and the electrical terminal in electrical contact with the externally accessible contact of the electrical conductor associated with the first core, the light generator being affixed to the end of the waveguide with the optical output substantially aligned with the first end of a second core of the plurality of cores and the electrical terminal in electrical contact with the externally accessible contact of the electrical conductor associated with the second core, a first integrated circuit including a transmitter with electrical input and output terminals, a second integrated circuit including a receiver with electrical input and output terminals, an electrical interconnect and mounting board including a first mounting area having the optical waveguide mounted thereon with the second end of the waveguide being positioned adjacent an external edge of the board and facing outwardly therefrom, a second mounting area having the first integrated circuit mounted thereon and including electrical conductors extending from adjacent the first mounting area to adjacent the second mounting area, and a third mounting area having the second integrated circuit mounted thereon and including electrical conductors extending from adjacent the first mounting area to adjacent the third mounting area, the board further including electrical input and output terminals, and the electrical conductors extending from adjacent the first mounting area to adjacent the second mounting area being connected in electrical contact with the electrical output terminal of the transmitter and the externally accessible portion of the electrical conductor associated with the first core, and the electrical input terminal of the transmitter being connected in electrical contact with an input terminal of the electrical interconnect and mounting board, the electrical conductors extending from adjacent the first mounting area to adjacent the third mounting area being connected in electrical contact with the electrical input terminal of the receiver and the externally accessible portion of the electrical conductor associated with the second core, and the electrical output terminal of the receiver being connected in electrical contact with an output terminal of the electrical interconnect and mounting board; and the electrical interconnect and mounting board being mounted on the substrate of the credit card pager so that the second end of the waveguide positioned adjacent the external edge of the board and the alignment guide formed in the second end of the waveguide are accessible outside the casing, and the electrical input and output terminals of the electrical interconnect and mounting board being coupled to the electronic circuitry of the credit card pager.

5. An external communication link for a credit card pager as claimed in claim 4 wherein the second end of the waveguide and the alignment guide are positioned in an edge of the credit card pager.

6. An external communication link for a credit card pager as claimed in claim 4 wherein the casing of the credit card pager and the optical transceiver module are constructed with a thickness of less than approximately one millimeter.

7. A credit card pager with external communication link comprising:

a credit card pager having electronic circuitry in a casing;

first and second optical transceiver modules each having a plurality of transmit and receive channels, each transmit channel including a light generator having an optical output and an electrical terminal positioned on a first surface thereof and a transmitter with electrical input and output terminals, and each receive channel including a light detector having an optical input and an electrical terminal positioned on a first surface thereof and a receiver with electrical input and output terminals, a first integrated circuit including all of the transmitters and a second integrated circuit including all of the receivers, an optical waveguide including a first cladding layer, a second cladding layer affixed in overlying relationship on the first cladding layer, a plurality of spaced apart light conducting cores positioned between the first and second cladding layers and substantially surrounded thereby, the cores each having first and second ends optically accessible at opposite ends of the waveguide, a plurality of electrical conductors formed in the first cladding layer and each conductor being associated with a different one of the plurality of cores and having an externally accessible contact positioned in a first end of the waveguide adjacent the first end of the associated core and an externally accessible portion positioned on an external surface of the first cladding layer, the waveguide further having a plurality of alignment ferrules formed in a second end of the waveguide opposite the first end, each of the light detectors being affixed to the end of the waveguide with the optical input substantially aligned with the first end of a core of the plurality of cores and the electrical terminal in electrical contact with the externally accessible contact of the electrical conductor associated with the aligned core, each of the light generators being affixed to the end of the waveguide with the optical output substantially aligned with the first end of a core of the plurality of cores and the electrical terminal in electrical contact with the externally accessible contact of the electrical conductor associated with the aligned core, an electrical interconnect and mounting board including a first mounting area having the optical waveguide mounted thereon with the second end of the waveguide being positioned adjacent an external edge of the board and facing outwardly therefrom, a second mounting area having the first integrated circuit mounted thereon and including a plurality of electrical conductors extending from adjacent the first mounting area to adjacent the second mounting area, and a third mounting area having the second integrated circuit mounted thereon and including a plurality of electrical conductors extending from adjacent the first mounting area to adjacent the third mounting area, the board further including electrical input and output terminals, the electrical output terminal of each of the transmitters being connected in electrical contact with one of the plurality of electrical conductors extending from adjacent the first mounting area to adjacent the second mounting area and the electrical input terminal of each of the transmitters being connected in electrical contact with an input terminal of the electrical interconnect and mounting board, the electrical input terminal of each of the receivers being connected in electrical contact with one of the plurality of electrical conductors extending from adjacent the first mounting area to adjacent the third mounting area and the electrical output terminal of each of the receivers being connected in electrical contact with an output terminal of the electrical interconnect and mounting board, and leads electrically connecting the externally accessible portion positioned on an external surface of the first cladding layer of each of the plurality of electrical conductors formed in the first cladding layer to one of the plurality of electrical conductors extending from adjacent the first mounting area to adjacent the second mounting area and to adjacent the third mounting area;

apparatus including circuitry for formatting information to be transmitted to and received from the credit card pager;

the first optical transceiver module being mounted in the casing of the credit card pager with the electrical input and output terminals of the electrical interconnect and mounting board of the first optical transceiver module being coupled to the electronic circuitry in the casing of the credit card pager and the second optical transceiver module being mounted in the apparatus with the electrical input and output terminals of the electrical interconnect and mounting board of the second optical transceiver module being coupled to the circuitry for formatting information in the apparatus; and an optical fiber ribbon with first and second ends and including a plurality of optical channels and a connector at each of the ends, which connectors are each formed with a plurality of outwardly extending pins that mate with the plurality of alignment ferrules in the optical waveguides, each core of the plurality of cores in the waveguides being optically aligned with an optical channel of the optical fiber ribbon with the outwardly extending pins engaged in the alignment ferrules.

8. An external communication link for a credit card pager as claimed in claim 7 wherein the second end of the waveguide and the alignment guide in the first optical transceiver module are positioned in an edge of the credit card pager.

9. An external communication link for a credit card pager as claimed in claim 8 wherein the casing of the credit card pager and the first optical transceiver module are constructed with a thickness of less than approximately one millimeter.

* * * * *